United States Patent [19] [11] 3,807,631
Mohr [45] Apr. 30, 1974

[54] HEATING, VENTILATING AND DEFROSTING SYSTEM FOR VEHICLES
[75] Inventor: Paul Mohr, Wolfsburg, Germany
[73] Assignee: Volkswagenwerk Aktiengesellschaft, Wolfsburg, Germany
[22] Filed: Dec. 1, 1972
[21] Appl. No.: 311,105

[30] Foreign Application Priority Data
Dec. 2, 1971 Germany............................ 2159742

[52] U.S. Cl............................. 237/12.3 A, 165/103
[51] Int. Cl............................................. B60h 1/02
[58] Field of Search.................. 237/12.3 B, 12.3 A; 165/35, 103

[56] References Cited
UNITED STATES PATENTS
2,729,158  1/1956  Wilfret............................ 237/12.3 B
3,735,809  5/1973  Matsushima....................... 165/103

*Primary Examiner*—William E. Wayner
*Attorney, Agent, or Firm*—Brumbaugh, Graves, Donohue & Raymond

[57] ABSTRACT

A heating, ventilating and defrosting system for vehicles has a mixing flap mounted in a heater housing movably about a pivot axis between first and second angular positions. In the first position, the mixing flap forms first and second seals with the housing respectively at opposite sides thereof and closes off all flow in the housing through and around the heater. In the second position, it forms at least a third seal with the housing and closes off flow in the housing around the heater but permits flow through the heater. In positions between the first and second positions, it permits various partial flows in the housing through and around the heater. The mixing flap and the housing are relatively configured so that the first seal closes before and opens after the second seal when the flap pivots back and forth between the first and second positions. It is thus possible to adjust the system to permit variable flow in the housing around the heater to passenger-compartment and defroster outlets formed in the housing downstream of the heater while preventing flow through the heater.

5 Claims, 7 Drawing Figures

HEATING, VENTILATING AND DEFROSTING SYSTEM FOR VEHICLES

BACKGROUND OF THE INVENTION

This invention relates to a heating, ventilating and defrosting system for vehicles and, more particularly, to a novel and highly effective arrangement, in a housing in an automotive vehicle, of a heater, a mixing valve or flap, a fresh-air intake duct, a duct for supplying fresh air, either heated or unheated, to the passenger compartment, and a defroster duct for supplying fresh air, either heated or unheated, to the windshield or other panes of the vehicle for the purpose of removing condensation.

It is conventional practice to provide a heater in a suitable housing of an automotive vehicle between a fresh-air inlet and an air outlet. The heater conventionally extends over only part of the flow cross section of the housing in which it is mounted, and a mixing flap or valve is mounted upstream of the heater: i.e., between the heater and the fresh-air inlet. The mixing valve or flap covers in one extreme position the part of the flow cross section occupied by the heater and permits in its other extreme position a flow only through the heater. In intermediate positions, it guides various partial flows through the two portions of the flow cross section, so that heated and unheated air streams are mixed and brought to an intermediate temperature before being supplied to the passenger compartment.

It is also conventional to provide at least one line leading from the housing to a defroster, which serves to keep the windshield and other panes of the vehicle free of condensation.

In conventional practice, the line to the defroster branches from the heater housing upstream of the heater, and the mixing valve or flap in one of its extreme positions covers only the heater, leaving the rest of the flow cross section unobstructed. Accordingly, in this extreme position of the mixing flap, there is a flow of unheated fresh air, delivered for example by the forward motion of the vehicle or by means of a blower in the fresh-air inlet, both through the outlet to the passenger compartment and through the line to the defroster. When the flap associated with the air outlet to the passenger compartment is closed, there remains a flow of air to the defroster, which, however, cannot be regulated. When outside temperatures are moderate, a small flow of fresh air is sufficient to keep the windshield free from condensation, and a larger flow of the comparatively cool fresh air may become uncomfortable for the passengers.

SUMMARY OF THE INVENTION

An object of the invention is to remedy the problems outlined above and, more particularly, to provide a heating, ventilating and defrosting system making it possible to control, as to both temperature and quantity, air flow to the passenger compartment and, independently, to the defroster, without the use of additional control elements such as flaps or valves.

The foregoing and other objects are attained in accordance with the invention by the provision of a housing formed with a fresh-air inlet, a passenger-compartment outlet, and a defroster outlet, a heater mounted within the housing downstream of the fresh-air inlet and upstream of the passenger-compartment and defroster outlets and extending over only a part of the cross-sectional flow area of the housing, and a mixing flap pivotally mounted in the housing and movable about a pivot axis between first and second angular positions. The mixing flap in the first position is upstream of the heater, forms first and second seals with the housing respectively at opposite sides thereof, and closes off all flow in the housing through and around the heater. In the second position it forms at least a third seal with the housing and closes off flow in the housing around the heater but permits flow through the heater. In positions between the first and second positions, it permits various partial flows in the housing through and around the heater. In accordance with the invention, the mixing flap and the housing are relatively configured so that the first seal closes before and opens after the second seal when the flap pivots back and forth between the first and second positions. It is thus possible to adjust the system to permit variable flow in the housing around the heater to the passenger-compartment and defroster outlets while preventing flow through the heater.

As noted above, the branching-off point of the line to the defroster is downstream of the heater. The heater is generally a conventional heat exchanger to which is delivered heat from the engine, conveyed, for example, by the cooling water, the cooling air, or the exhaust gas. The heater can of course also derive heat from an additional burner or an electric heating device.

Since the junction of the line to the defroster is downstream of the heater, and since the mixing flap and the housing are designed so that the mixing flap over a given portion of its movement creates a flow path bypassing the heater, it becomes possible to regulate the air volume passing through the defroster by adjustment of the mixing flap. This is a considerable advantage, since the mixing flap is available anyway. Moreover, since the air outlet to the passenger space is downstream of the heater and the mixing flap, a regulation of the fresh-air flow to the passenger space can be obtained by means of the mixing flap, too, when the flap is open.

U.S. Pat. No. 2,738,718 discloses a heating, ventilating and defrosting system in which the fresh air is delivered by means including a swiveling flap mounted in the air scoop of a motor vehicle. The flap is followed by two channels one of which is in direct connection with the interior of the vehicle and the other of which conducts the fresh air caught by means of the flap over a blower and a heat exchanger into the interior of the vehicle and also to defroster nozzles behind the windshield. The wall between the two channels ends in the area of the flap in an elastic lip which applies itself against the flap even if its opening is slight, so that initially only the first-named channel is supplied with air. Only if the flap is swiveled by a minimum angle is a slot produced between the flap and the lip so that then also a noticeable quantity of air is delivered to the second channel.

In contrast thereto, the device in accordance with the present invention offers the possibility of adjusting both the quantity and the temperature of the air supplied to the defroster.

The preferred embodiment of the invention is characterized in that the housing adjacent to one portion of the path of movement of the mixing flap describes in cross section a circular arc around the axis of rotation of the mixing flap and extends from that point into the fresh-air inlet. Evidently, auxiliary seals may be provided. However, if tolerances, which need not be very close, are adhered to in the manufacture of the housing and the mixing flap, these auxiliary seals can be dispensed with.

As noted above, by means of the mixing flap alone a complete closing of the total flow cross section can be achieved, so that the junction of the line to the defroster is separated from the flow. It may nevertheless be desirable to provide a second flap, which cooperates with the passenger-compartment and defroster outlets and which must not be confused with the mixing flap. Preferably, the second flap can be swiveled between three positions in the first of which it closes the housing (only the defroster can receive an air flow, the air outlet to the passenger compartment being closed), in the second of which it is swiveled out of the housing (air can flow through both the defroster and the passenger-compartment air outlets), and in the third of which it is swiveled into the housing (thereby separating the defroster line from the output of the heater). This third position also makes it possible to supply unheated air to the passenger compartment without switching on the defroster nozzles, which might create a draft annoying to the passengers.

The second and third seals are formed by cooperation of spaced-apart portions of the housing with generally the same portion of the mixing flap, and the housing is contoured so that it is spaced apart from the path of movement of such portion of the mixing flap as the mixing flap moves between the first and second positions. Thus, the second and third seals are formed only when the mixing flap is at either limit of its range of movement.

In the intermediate positions of the mixing flap, there is a space between the mixing flap and the housing which is a function of the position of the mixing flap, so that in these intermediate positions a flow of air is possible.

Furthermore, there is preferably a supplemental fresh-air duct leading to the passenger compartment and communicating with the fresh-air inlet a point upstream of the heater. The housing includes a zone of transition between the freah-air duct leading to the passenger compartment and the fresh-air inlet. The housing is preferably designed in such a manner that the mixing flap in its second extreme position forms a fourth seal against the housing in the zone of transition. Thus, even if one forgets to close the additional flap usually provided in the supplemental fresh-air line, this embodiment of the invention ensures that, during a maximum heating operation, no cold air is conducted into the interior of the vehicle.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

Figure 7:
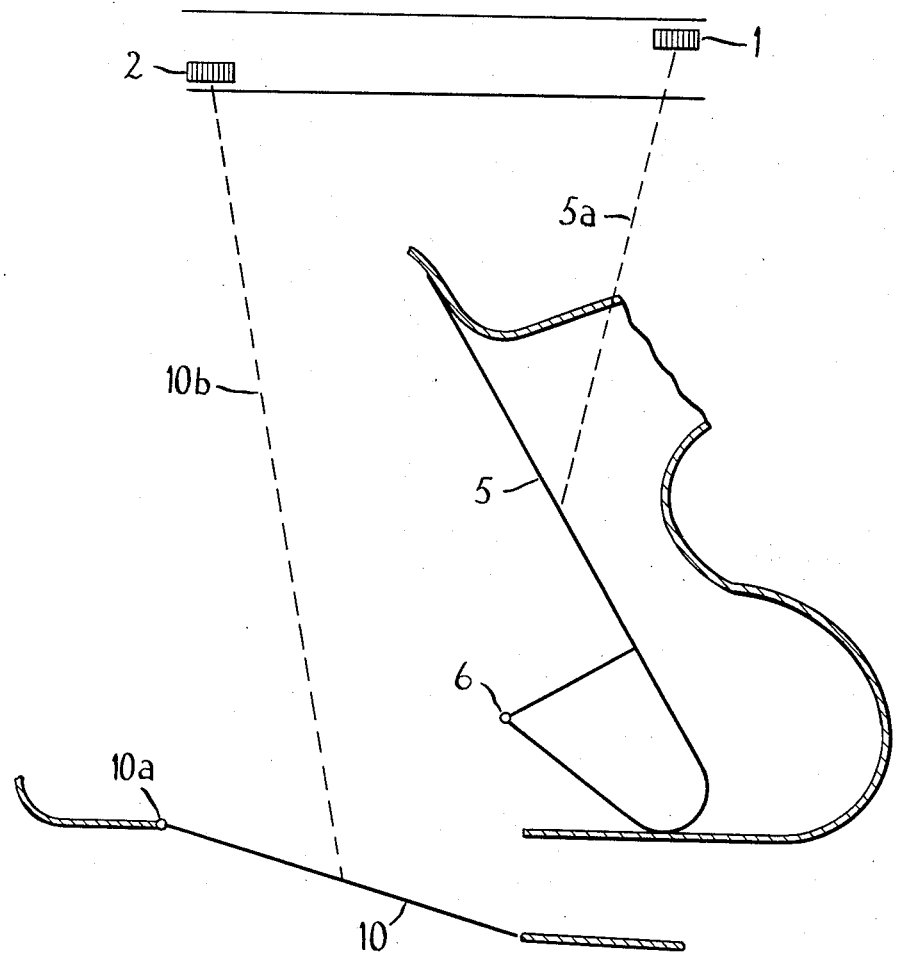
FIG. 7 is a schematic view showing the connection between the controls and the flaps.

All of the figures show in their upper portions the position of an operating lever 1 connected by any suitable means such as a linkage 5a (see FIG. 7) to a mixing flap 5 and an operating lever 2 connected by any suitable means such as a linkage 10b to a flap 10 associated with the passenger-compartment air outlet.

Figure 3:
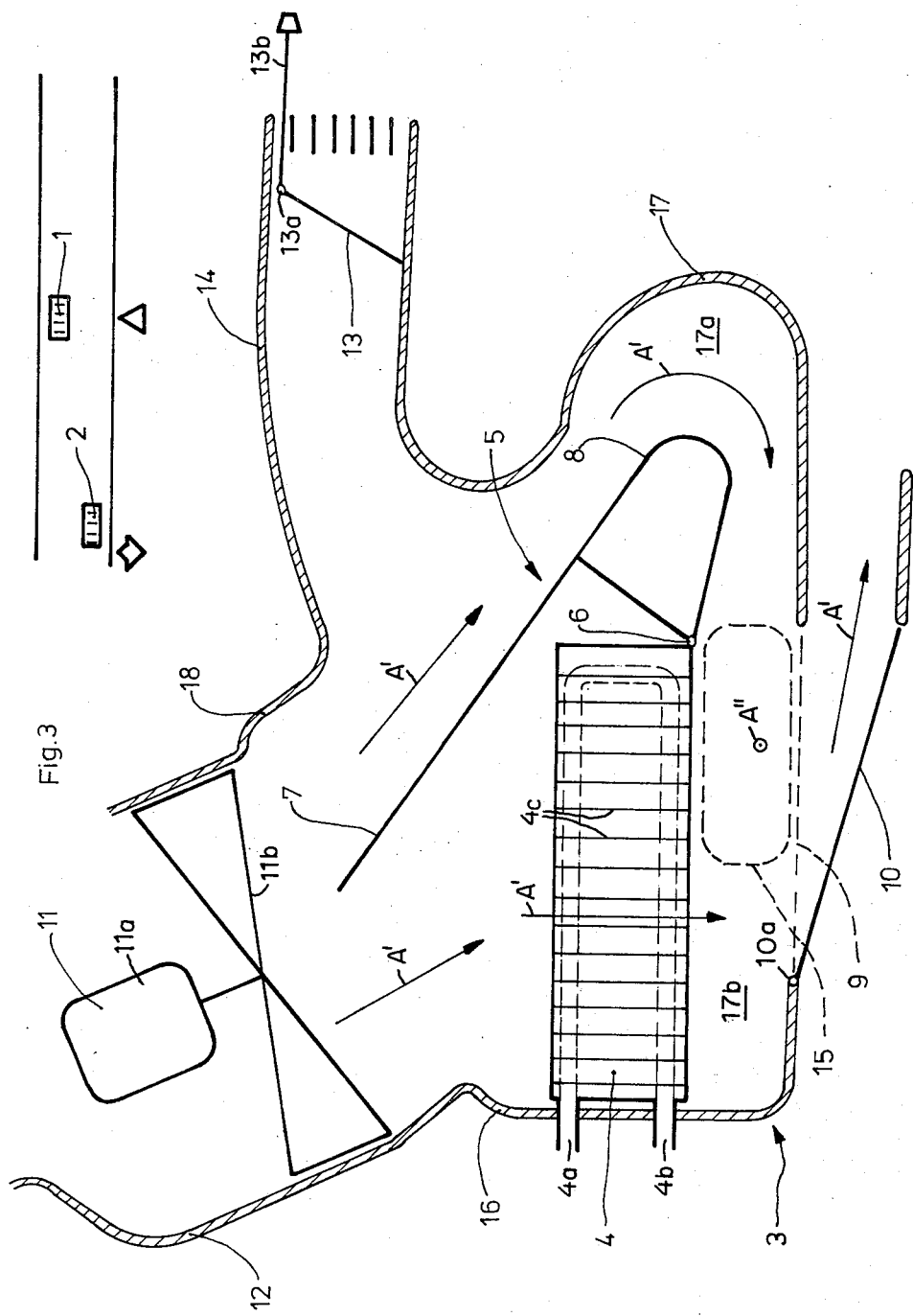
Figure 4:
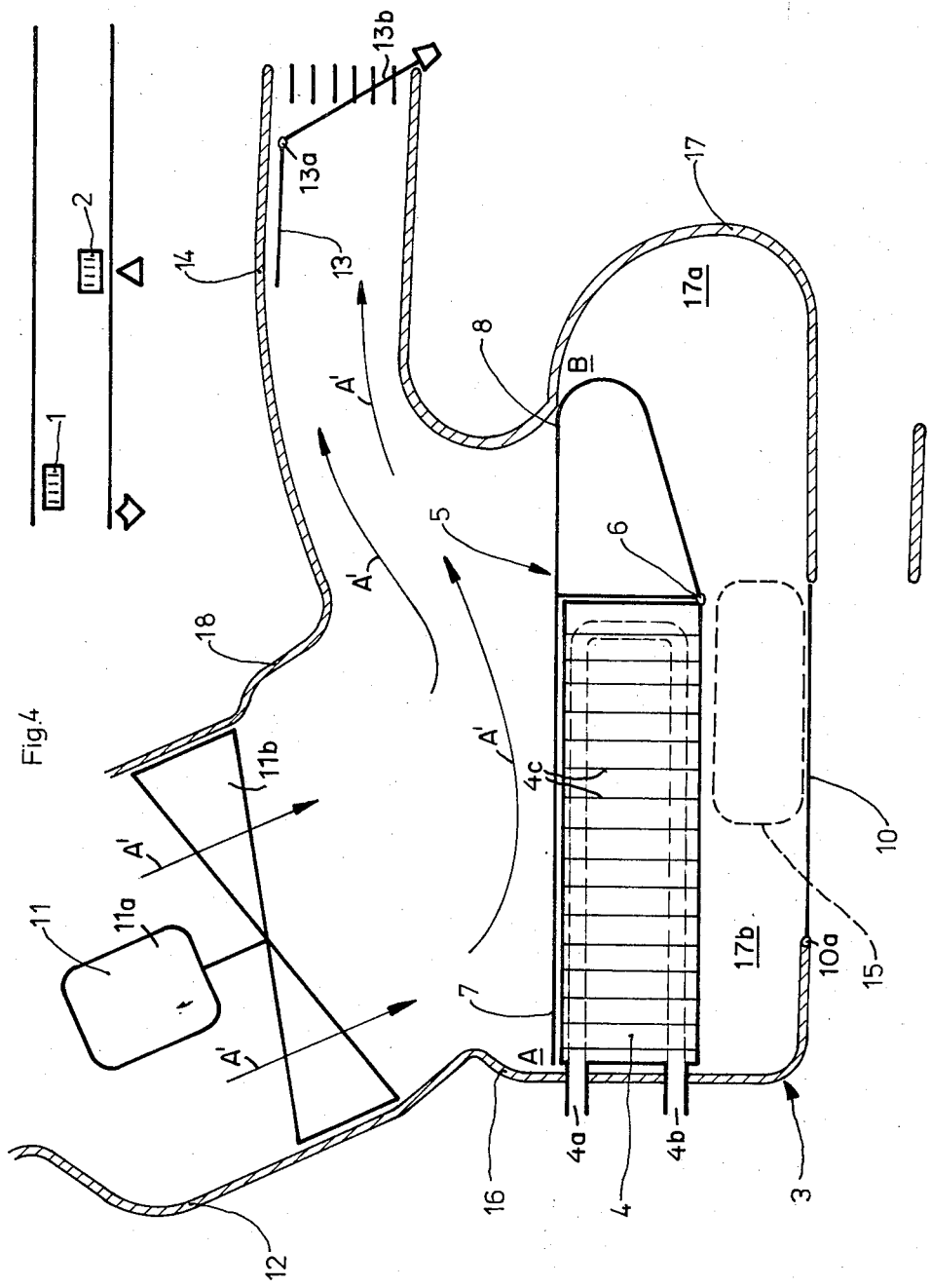

When the lever 1 is moved all the way to the left, as in FIG. 4, the flap 5 is rotated counterclockwise to a first position and forms first and second seals A and B, respectively, with the housing 3. When the lever 1 is moved all the way to the right, as in FIGS. 1, 2 and 6, the flap 5 is rotated clockwise to a second position and forms third and fourth seals C and D, respectively, with the housing 3. At intermediate positions of the lever 1, as in FIGS. 3 and 5, the seals B, C and D are broken; seal A is broken or not, depending on how far the lever 1 is moved away from the extreme left-hand position. Compare FIG. 3, in which the seal A is broken, and FIG. 5 in which it is intact. In all of the figures, arrows A' (in the plane of the figures) and A" (normal to the plane of the figures) show the direction of air flow.

Thus, when the lever 1 in the figures is moved away from the left-hand position to the right, there is first created a path 17a for flow around the heater 3 then a path 17b for flow through the heater. A shift of the lever 2 in the figures from left to right causes movement of the flap 10 from the position of FIGS. 1 and 3 to the position of FIGS. 2, 4 and 5 and then to the position of FIG. 6.

The mixing flap is mounted for pivotal movement about a swivel bearing 6 and has a first zone 7 and a second zone 8. The flap 10 is mounted in the passenger-compartment air outlet 9 for pivotal movement about a swivel bearing 10a. The fresh-air inlet 12 contains a blower 11 comprising a motor 11a driving blades 11b, and a supplemental passenger-compartment fresh-air outlet 14 is provided with a flap 13 mounted for pivotal movement about a swivel bearing 13a under the control of a control lever 13b. The defroster outlet to a windshield defroster is designated by 15. The defroster duct extends in a direction normal to the plane of the figures then curves upward to the defroster nozzles (not shown).

The heater 4 is typically a heat exchanger having an inlet 4a and an outlet 4b for a heat-exchange fluid, such as the engine exhaust or the air or water which is used to cool the vehicle engine and which in cooling the engine becomes heated. The heated fluid passes through one or more coils around which are mounted fins 4c made of a good heat conductor to facilitate exchange of heat between the heated fluid in the heater coils and the air flowing over the fins.

The housing 3 has a zone 16 between the heater 4 and the fresh-air inlet or intake duct 12 which in cross section describes a circular arc around the swivel axis 6 of the mixing flap 5. Moreover, on the opposite side, the housing is provided with an enlarged portion 17 which forms a seal with the portion 8 of the flap 5 only in the two extreme positions of the flap 5. At intermediate positions of the flap 5, there is a passage for air 17a (FIGS. 3 and 5) between the intake duct 12 and the outlet 9 to the passenger-compartment.

Figure 1:
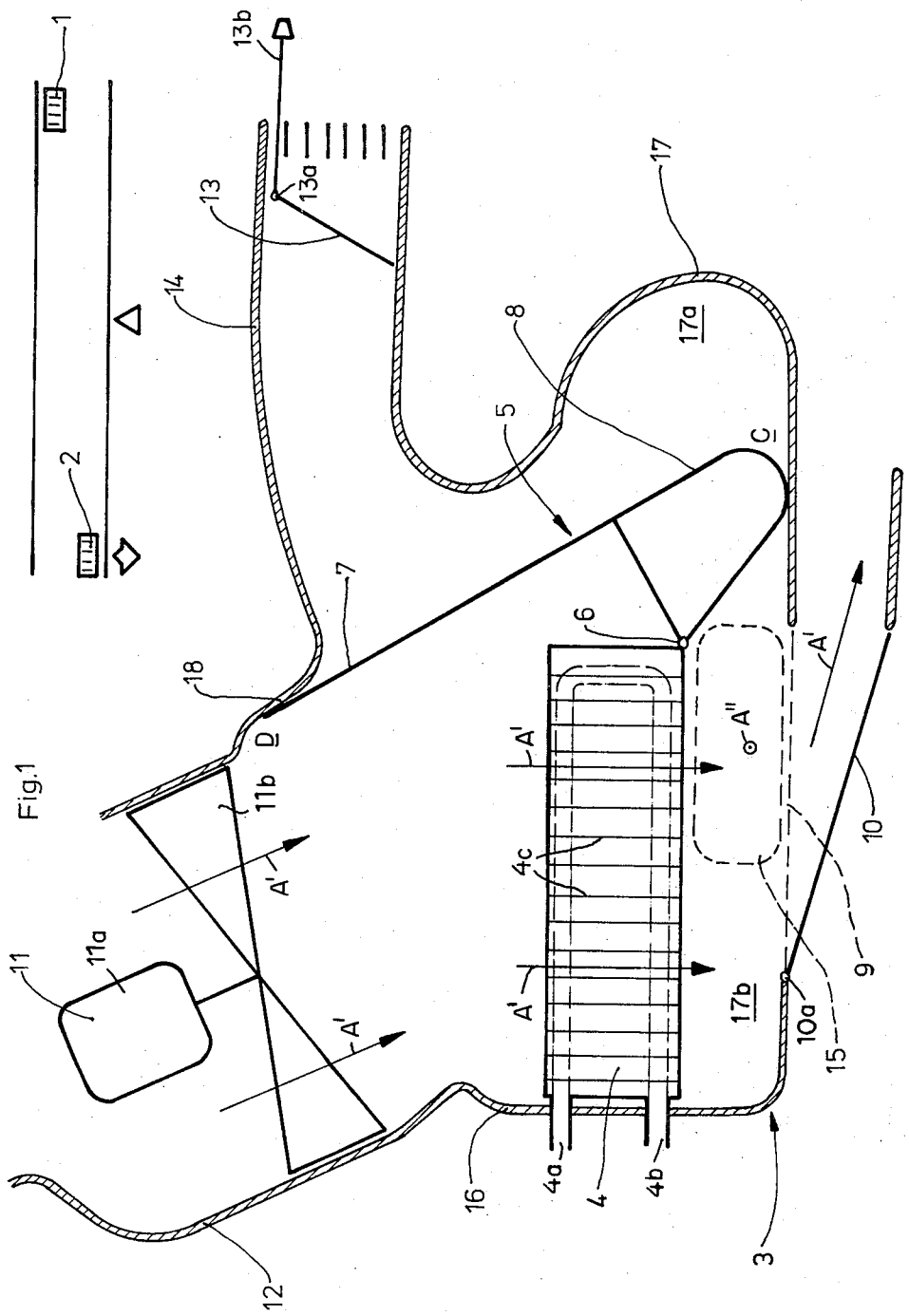
FIG. 1 is a schematic view of a heating, ventilating and defrosting system in accordance with the invention, the controls being set for a first condition of operation.

FIG. 1 illustrates the setting for maximum heating and defrosting without any ventilating over the line 14. The control 1 for the flap 5 is all the way to the right, the control 2 for the flap 10 is all the way to the left, and the control 13b for the flap 13 is all the way up. The mixing flap 5 is swiveled to its second extreme position in which it permits a flow only over the heater 4. Accordingly, only heated air can reach the outlet 15 to the defroster duct and the outlet 9 to the interior of the vehicle. The remaining part of the flow cross section in the housing 3 is closed off by the application of the zone 7 of the mixing flap 5 against the zone 18 of the housing 3. As noted above, the zone 18 is between the fresh-air intake duct 12 and the fresh-air ventilating duct 14. The flap 13 is closed so that the line 14 is additionally secured.

Figure 2:
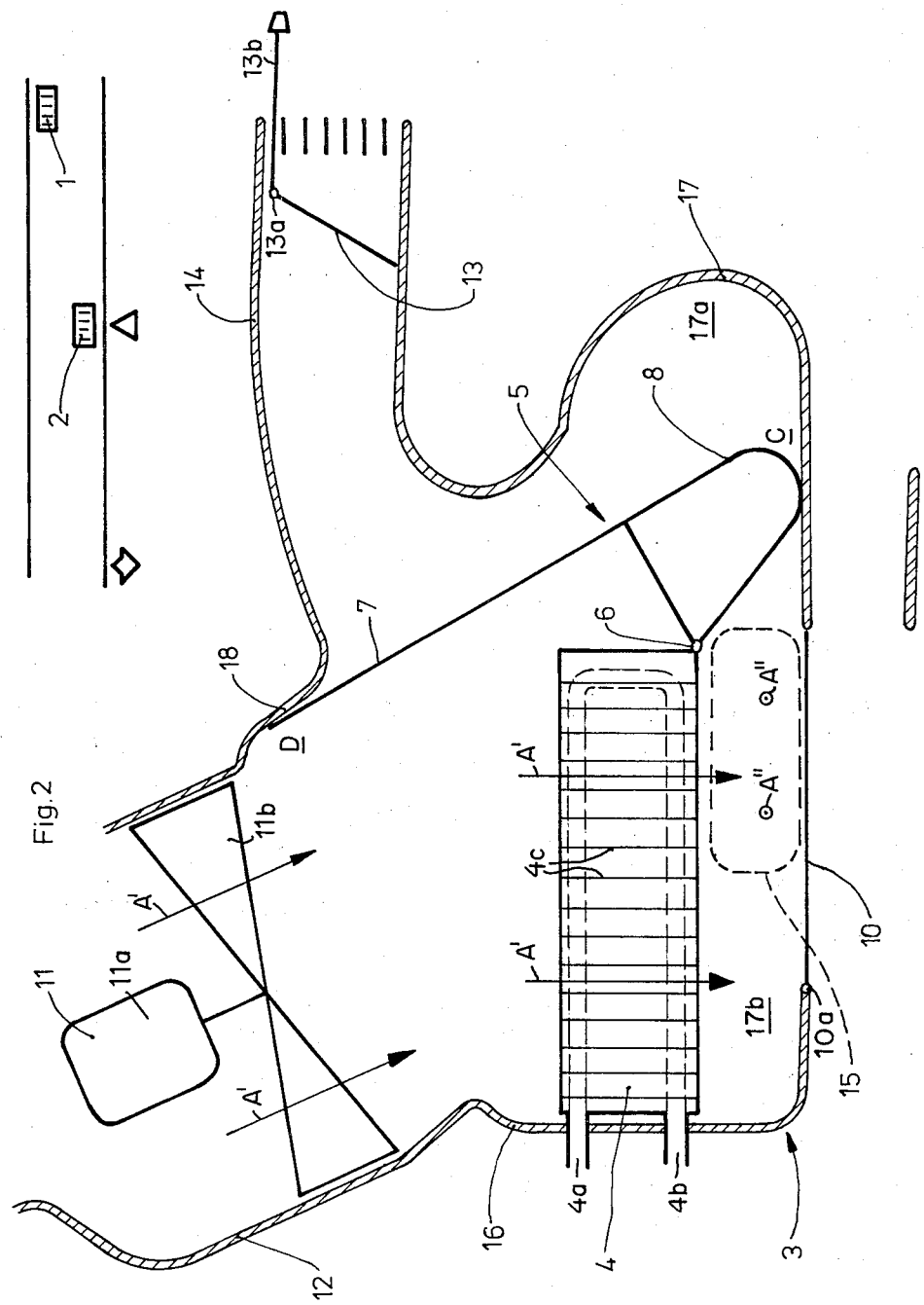
FIGS. 2–6 are views corresponding to FIG. 1 but respectively showing the controls set for five other conditions of operation.

FIG. 2 shows the mixing flap 5 and its control 1 in the same respective positions as in FIG. 1. However, now the flap 10 has been swiveled by its control 2 into its center position in which it closes off the housing 3. Accordingly, the heated air reaches only the outlet 15 to the defroster duct. The interior of the vehicle is not heated nor is any fresh air delivered to it.

FIG. 3 illustrates an adjustment for intermediate-temperature heating and defrosting. The mixing flap 5 is adjusted by its control 1 so that it assumes an intermediate position between its two extreme positions and partially frees the one portion of the flow cross section passing over the heater 4 as also the additional portion of the flow cross section bypassing the heater 4. There is thus obtained downstream of the heater 4 a mixture of heated and unheated air, i.e., air having an intermediate temperature. This air is delivered to the defroster via the outlet 15 and into the interior of the vehicle via the outlet 9. In addition, it is possible by opening the flap 13 to ventilate with cold air.

FIG. 4 shows the mixing flap 5 swiveled into its extreme position in which it closes off both portions 17a and 17b of the flow cross section in the housing 3. The zone 16 of the housing forms a seal with the edge of zone 7 of the mixing flap 5, and the portion 17 of the housing forms a seal with the edge of the zone 8 of the mixing flap 5. It remains possible, however, as FIG. 4 shows, to ventilate the vehicle interior by opening of the flap 13.

Figure 5:
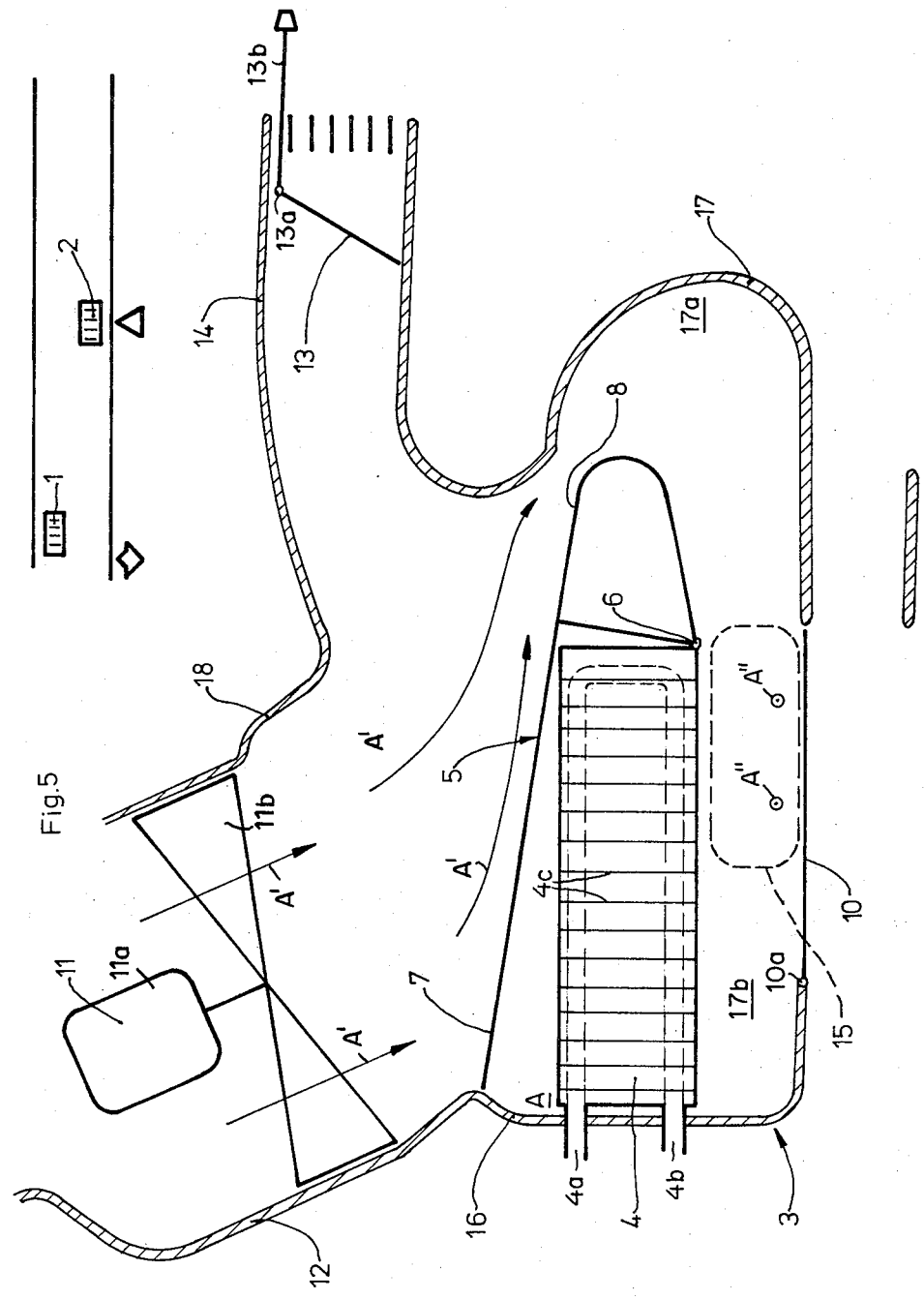

At first blush, the manner of operation shown in FIG. 5 appears to resemble that shown in FIG. 4. In FIG. 5, however, the mixing flap 5 has been swiveled away from its first extreme position. As before, the edge of its zone 7 forms a seal A with the zone 16 of the housing, so that, as in the previous case, the heater remains outside the flow. Still, a flow can develop, since, between the zone 8 of the mixing flap 5 and the housing portion 17, the passage 17a is open. Within this range of swivel movement of the flap 5, there is thus the possibility of regulated defrosting without heating: that is, it is possible to deliver fresh air to the outlet 15 to the defroster line at a rate which can be adjusted.

Figure 6:
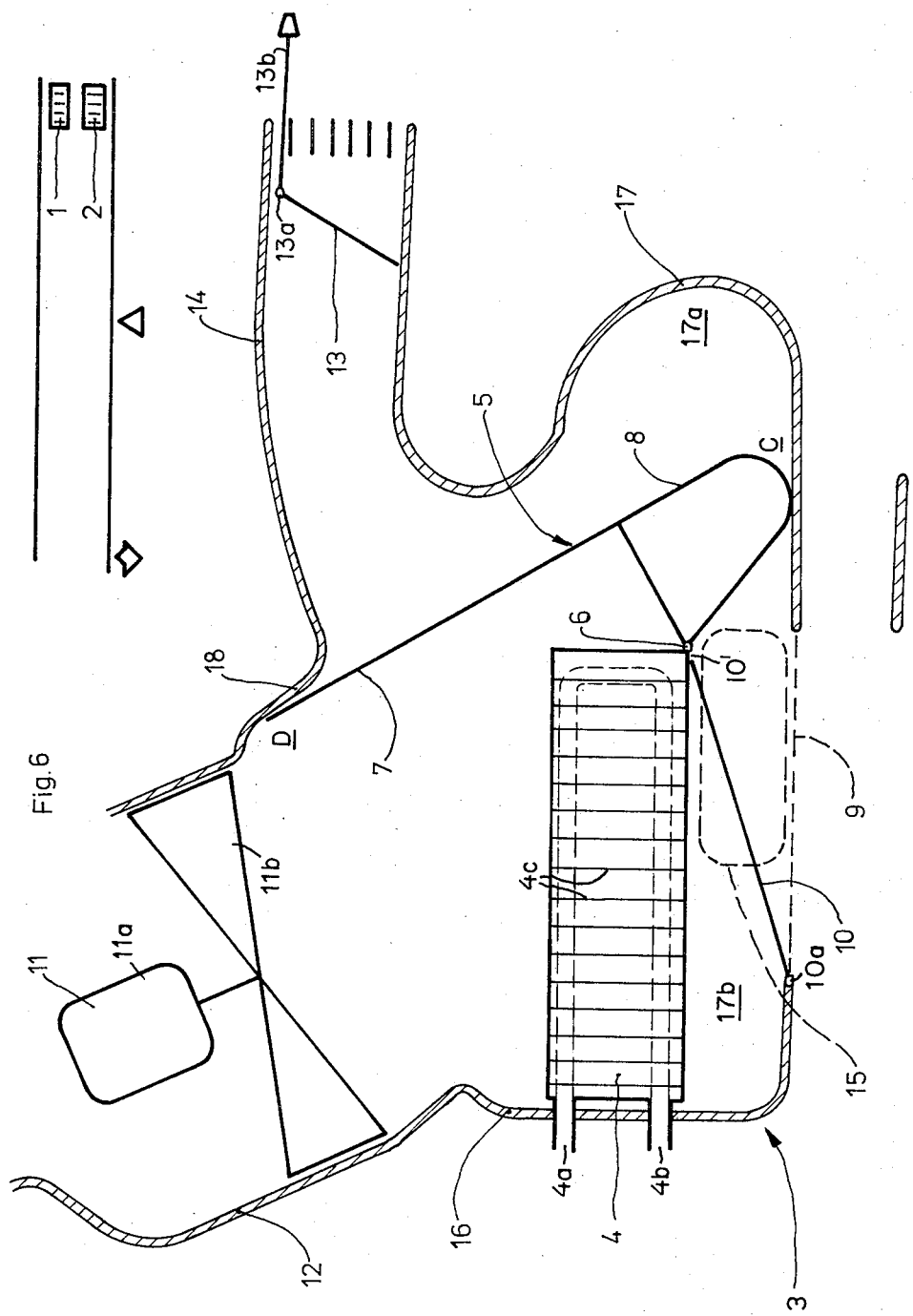

Finally, FIG. 6 shows the adjustment of the apparatus in such a manner that there is no heating, ventilating, or defrosting: the mixing flap 5 is closed, and the flap 10 is swiveled into the housing 3 to form a seal at 10'. The outlet 15 to the defroster line is now effectively outside the housing 3 so that no air at all is delivered to it.

Thus there is provided in accordance with the invention a novel and highly effective heating, ventilating, and defrosting system. Many modifications of the representative embodiments disclosed herein will readily occur to those skilled in the art. Accordingly, the invention is not limited except by the appended claims.

I claim:

1. A heating, ventilating and defrosting system for vehicles, comprising a housing formed with a fresh-air inlet, a passenger-compartment outlet, and a defroster outlet, a heater mounted within the housing downstream of the fresh-air inlet and upstream of the passenger-compartment and defroster outlets and extending over only a part of the cross-sectional flow area of the housing, a mixing flap, means mounting the mixing flap in the housing movably about a pivot axis between first and second angular positions, the mixing flap in said first position being upstream of the heater, forming first and second seals with the housing respectively at opposite sides thereof and closing off all flow in the housing through and around the heater, in said second position forming at least a third seal with the housing and closing off flow in the housing around the heater but permitting flow through the heater, and, in positions between said first and second positions, permitting various partial flows in the housing through and around the heater, the mixing flap and the housing being relatively configured so that said first seal closes before and opens after said second seal when the flap pivots back and forth between said first and second positions, whereby it is possible to adjust the system to permit variable flow in the housing around the heater to the passenger-compartment and defroster outlets while preventing flow through the heater.

2. A heating, ventilating and defrosting system for vehicles according to claim 1 wherein the housing adjacent to the first seal is formed with an inner wall describing in section a circular arc centered on said pivot axis, so that said first seal is maintained during a certain range of angular movement of the flap adjacent to said first position.

3. A heating, ventilating and defrosting system for vehicles according to claim 1 further comprising a second flap cooperating with the passenger-compartment and defroster outlets and selectively movable to a first position in which it closes the passenger-compartment outlet and leaves the defroster outlet open, a second position in which it leaves the passenger-compartment and defroster outlets open, and a third position in which it separates the passenger-compartment and defroster outlets from the heater.

4. A heating, ventilating and defrosting system for vehicles according to claim 1 wherein said second and third seals are formed by cooperation of spaced-apart portions of the housing with generally the same portion of the mixing flap and wherein the housing is contoured so that it is spaced apart from the path of movement of said portion of the mixing flap as the mixing flap moves between said first and second positions.

5. A heating, ventilating and defrosting system for vehicles according to claim 1 wherein the housing is formed with a supplemental passenger-compartment outlet downstream of the fresh-air inlet and upstream of the heater and wherein the mixing flap in said second position forms a fourth seal with the housing, said fourth seal being upstream of the supplemental passenger-compartment outlet, so that, when the mixing flap is in said second position, it closes off flow through the supplemental passenger-compartment outlet.

* * * * *